Aug. 30, 1949.  J. T. MYERS  2,480,378
RECIPROCATING BENDER FOR FORMING TUBULAR BUSHINGS
Filed June 26, 1946  4 Sheets-Sheet 1

INVENTOR.
John T. Myers
BY
Attorney.

Aug. 30, 1949. J. T. MYERS 2,480,378
RECIPROCATING BENDER FOR FORMING TUBULAR BUSHINGS
Filed June 26, 1946 4 Sheets-Sheet 3

INVENTOR.
John T. Myers
BY
Attorney.

Aug. 30, 1949.  J. T. MYERS  2,480,378
RECIPROCATING BENDER FOR FORMING TUBULAR BUSHINGS
Filed June 26, 1946  4 Sheets-Sheet 4
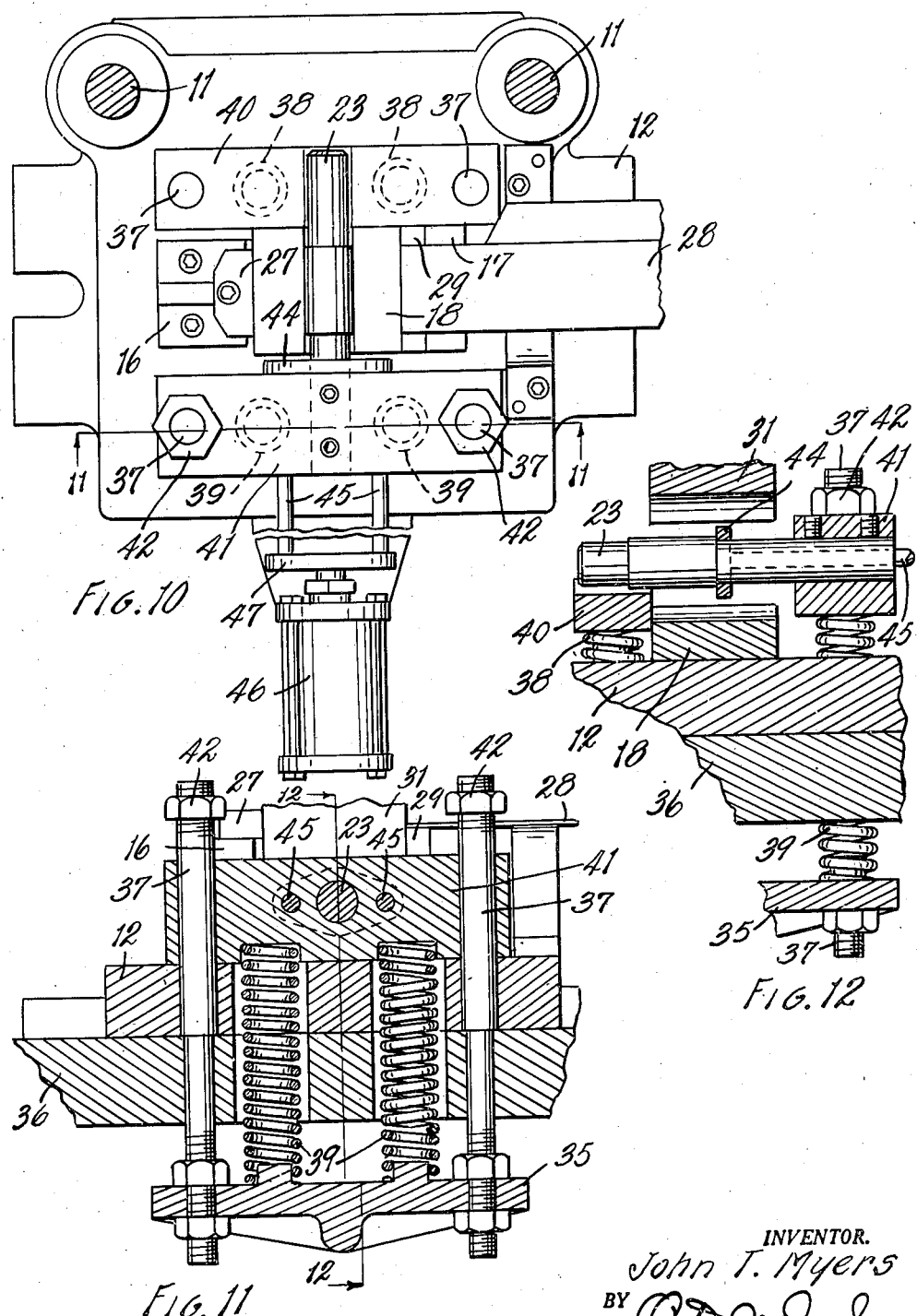
INVENTOR.
John T. Myers
BY
Attorney.

Patented Aug. 30, 1949

2,480,378

UNITED STATES PATENT OFFICE 2,480,378

RECIPROCATING BENDER FOR FORMING TUBULAR BUSHINGS

John T. Myers, Battle Creek, Mich., assignor to Kendall Machine and Tool Company, Battle Creek, Mich., a copartnership Application June 26, 1946, Serial No. 679,517

8 Claims. (Cl. 153—49)

1

The principal objects of this invention are:

First, to provide a machine which will form a complete bushing with one continuous stroke of the machine.

Second, to provide a machine which will form a bushing and automatically eject the completed bushing after it is formed.

Third, to provide a machine which will make a bushing directly from strip stock without previously forming individual blanks or pieces.

The drawings, of which there are four sheets show the preferred form and one modified form of the invention and two types of bushings which it will produce.

Fig. 10 represents a plan view of the bolster and die plate showing a completed bushing in place thereon.

Fig. 11 represents a vertical cross-sectional view taken along the line 11—11 of Fig. 10.

Fig. 12 represents a vertical cross-sectional view taken along the line 12—12 of Figs. 10 and 11.

Figure 2:
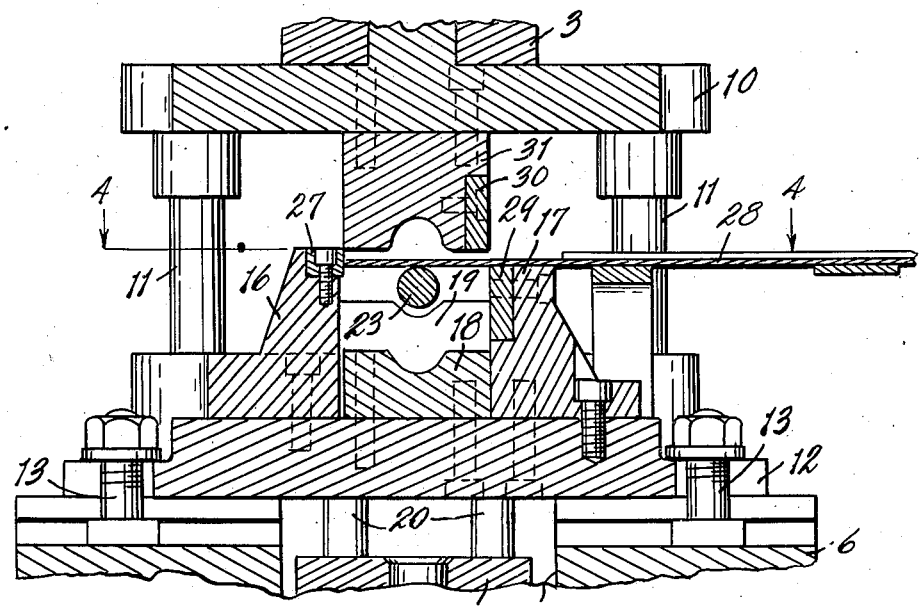
Fig. 2 is an enlarged fragmentary view mainly in section on the line 2—2 in Figs. 1 and 4 and showing the machine at the start of an operation.
Figure 3:
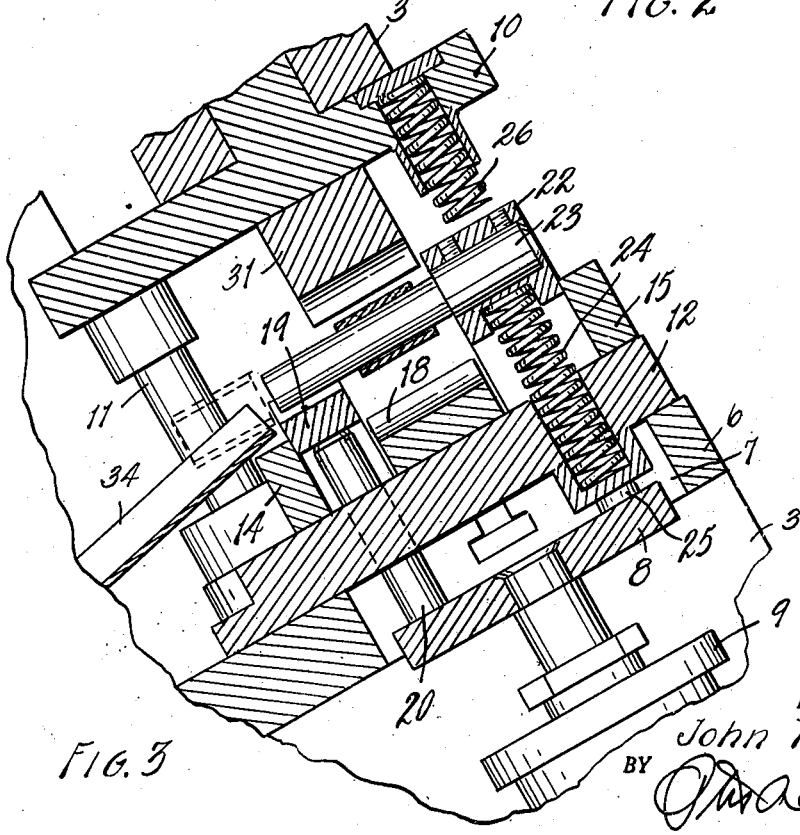
Fig. 3 is an enlarged fragmentary view mainly in section on line 3—3 in Fig. 5, showing the machine near the end of a cycle of operation.
Figure 4:
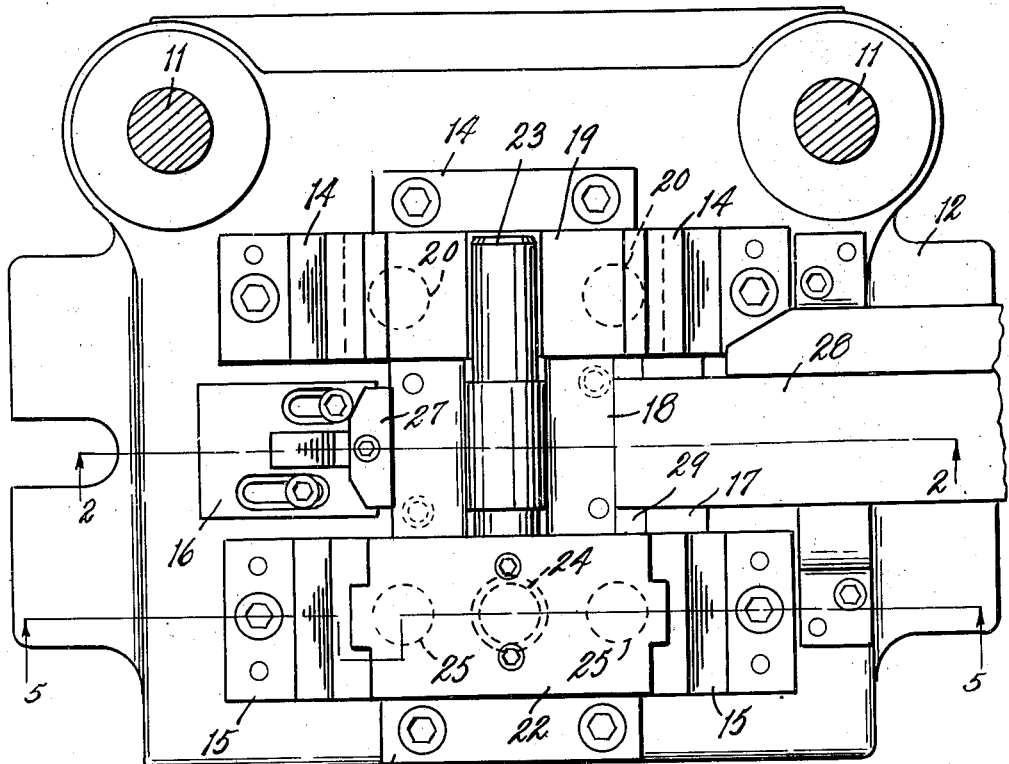
Fig. 4 is an enlarged fragmentary view taken along the line 4—4 in Figs. 1 and 2, showing the machine near the end of a cycle of operation.
Figure 5:
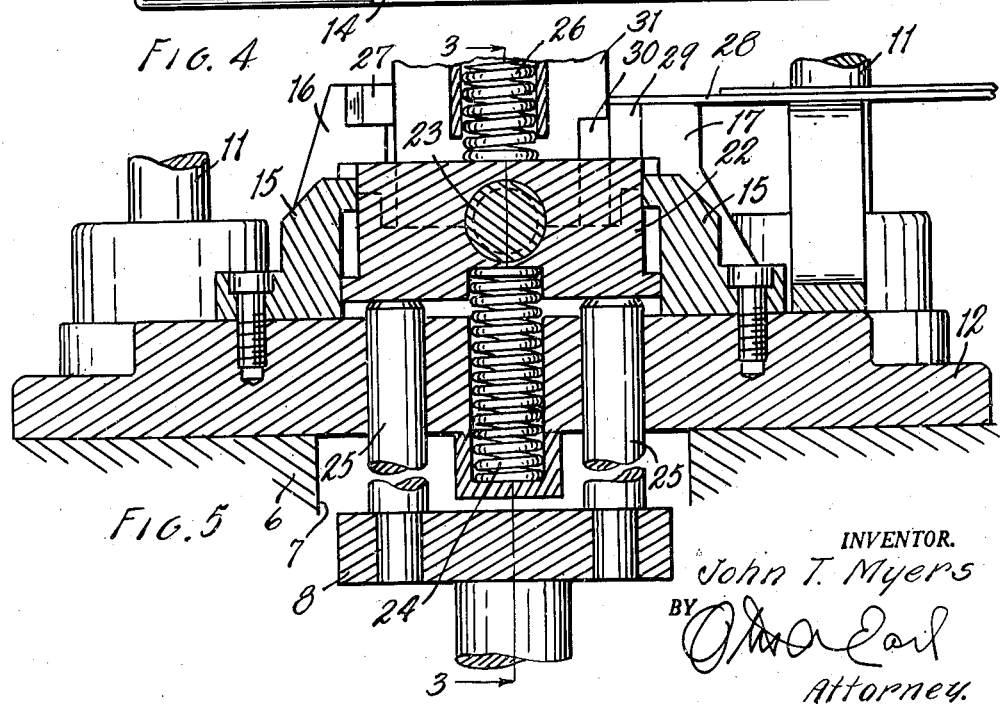
Fig. 5 is a fragmentary view mainly in section on line 5—5 in Fig. 4 and shows the machine in its furthest depressed position.

The machine consists generally of a body member 1 supported upon a base 2 and provided with punch press mechanism 3 operated in the usual fashion from a shaft 4. The bed 5 of the press, and bolster 6 are apertured in the center as at 7 (see Figs. 2, 3, and 5) to pass the plate 8 secured to the end of the piston shaft of an air

2 cylinder 9 mounted below the bed of the press. The slide 10 of the press is provided with heavy guide pins 11, which slide in guide holes provided in the die plate 12 for maintaining the upper and lower dies of the machine in proper alignment. The die plate 12 is secured to the bolster by suitable bolts 13.

With particular reference to Figs. 2 through 5, it will be noted that the die plate 12 has secured thereto a rear mandrel guide 14 and a front mandrel guide 15. Positioned between the mandrel guides and also secured to the die plate is a stop block 16 and a shear block 17. Positioned at the center of the die-plate is the lower die 18 held in place by suitable dowel pins and screws.

The rear mandrel guide 14 has slidably mounted therein the anvil 19 which is arranged to be raised in the guide under the influence of the fingers 20 mounted on the plate 8 of the air cylinder 9. Positioned in the forward mandrel guide 15 is a mandrel holder 22 which has a cylindrical mandrel 23 securely fastened therein. The front mandrel holder is arranged to be urged upwardly by fingers 25 secured to the plate 8 and by the coil spring 24 mounted in a recess in the die plate. The holder will be pressed downwardly against the forward fingers 25 by the action of a stiffer spring 26 mounted on the slide 10.

The stop block 16 is provided with an abutment 27 of hardened steel against which the end of a strip of stock indicated at 28 is arranged to abut when fed into the machine. The shear block 17 is provided with a hardened shear plate 29 arranged to cooperate with an upper shear plate 30 secured to the upper die 31. The upper die is secured to the face of the slide directly over the lower die 18.

In its initial position the machine will have its slide raised and the air cylinder 9 expanded, which will cause the fingers 20 and 25 to raise the anvil 19 and the mandrel holder 22 in the mandrel guides. The lower spring 24 will raise the mandrel holder above the ends of the forward pins 25 so that the free end of the mandrel will be raised off the anvil 19. The slide 10 with the upper die and spring 26 will be raised clear of the mandrel holder and shear block. The stock 28 may then be fed into the machine either automatically or manually and the cycle of operation started.

Figure 1:
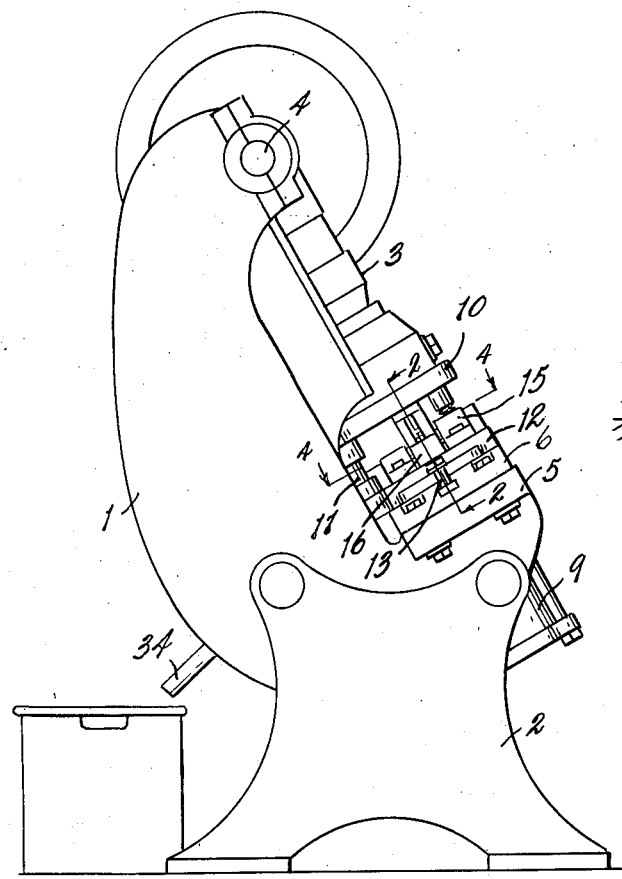
Fig. 1 represents a side elevational view of the entire machine, parts being shown conventionally.
Figure 6:
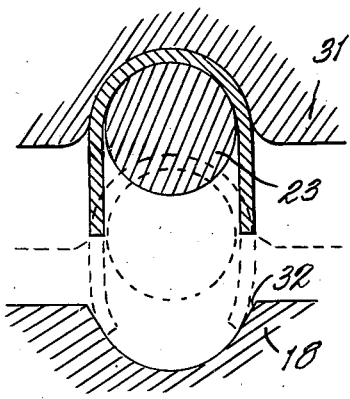
Fig. 6 is an enlarged fragmentary cross-sectional view showing a partially completed bushing in the machine and illustrating steps in the forming of the bushing.
Figure 7:
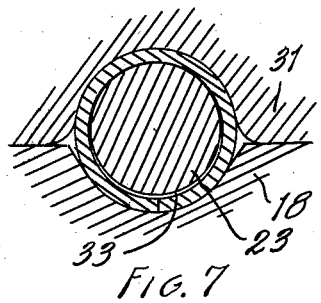
Fig. 7 represents a fragmentary cross-sectional view showing a completed bushing in the machine.

The first portion of the downward movement of the slide 10 will engage the stock between the mandrel and the upper die, the mandrel being held up only by the action of the lower spring 24. Continued downward movement of the slide will shear off the stock between the shear plates 29 and 30 and commence to bend the sheared piece around the mandrel. As the upper die folds the stock around the mandrel and descends relative to the mandrel, the upper spring 26 will be brought into contact with the mandrel holder 22. The upper spring 26 being stiffer than the lower spring 24 will depress the mandrel holder against the lower spring until the mandrel holder engages the upper ends of the forward fingers 25. At this point the mandrel 23 will be in contact with the anvil 19 and further lowering of the slide will press the work into the shape shown in Fig. 6, and force the anvil 19 and mandrel holder down against the air pressure in the cylinder 9 until the lower edges of the work engage the lower die 18. The face of the lower die 18 is sloped at the edges as at 32 to start the edges of the stock into a cylindrical surface as indicated by the dotted lines. Continued lowering of the slide will completely engage the upper and lower dies to form a completed bushing as shown in Fig. 7.

Attention is called to the fact that the mandrel 23 is of smaller diameter than the inside of the bushing, so that a clearance is left between the mandrel and the bushing as indicated at 33.

As the slide is now raised, air pressure built up in the cylinder 9 by the depressing of the fingers 20 and 25 and their mounting plate 8 will force the fingers upwardly causing the mandrel holder 22 and anvil 19 to follow the upper die in its upward movement. After the pins 20 and 25 have reached the limit of their upward movement and the spring 26 has cleared the mandrel holder 22, the lower spring 24 will raise the mandrel holder and mandrel clear of the anvil 19. The machine being mounted at an angle with the mandrel sloping downwardly at the rear, the completed bushing will slide off the mandrel into a chute 34 as indicated by the dotted lines in Fig. 3 and the machine is ready to commence another cycle of operation. The entire operation of forming the bushing and removing it from the machine has thus been automatic after the bar stock was inserted and the machine started.

Figure 8:
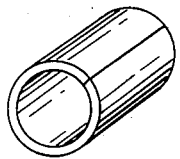
Fig. 8 represents a perspective view of one type of bushing which can be made in the machine.
Figure 9:
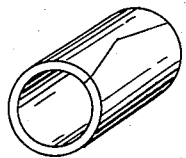
Fig. 9 represents a perspective view of the alternative type of bushing which may be made in the machine.

If the shear plates 29 and 30 are formed with straight edges, a bushing such as that shown in Fig. 8 will be formed. The shear plates may, however, be formed with V-shaped edges to produce a bushing such as is shown in Fig. 9.

In the modified form of the invention illustrated in Figs. 10, 11, and 12, parts which have not been changed from the preferred form of the invention have been given the same reference characters as in the preferred form.

The body of the machine in its modified form is provided with a bracket 35 positioned underneath the bolster 36 and forming a support for the four guide rods 37 and two pairs of springs 38 and 39. The bolster 36 and the die plate 12 positioned on top of the bolster are apertured to pass both the bolts and the springs.

Slidably mounted on the rear guide rods 37 is the anvil 40 which is arranged to be pushed upwardly on the guide rods by the rear springs 38 and downwardly against the die plate by the free end of the mandrel 23 under the influence of the upper die 31.

The forward rods 37 act as guides for the mandrel holder block 41 which is urged upwardly thereon by the forward springs 39 and downwardly by the mandrel 23 under the influence of the upper die 31. The forward springs 39 are longer than the rear springs 38 so that the mandrel holder 41 will be raised higher than the anvil 40. Limiting nuts 42 are threaded on the upper ends of the forward rods 37 to limit the upward movement of the mandrel holder 41.

Positioned around the mandrel 23 is an oval-shaped knock-off piece 44 which is movable axially of the mandrel under the influence of the push rods 45 which extend through the mandrel holder block on each side of the mandrel. The push rods are actuated by the pneumatic cylinder 46 which carries the plate 47 for engaging the ends of the rods 45 in any position of the mandrel holder. Springs (not illustrated) may be positioned around the rear ends of the rods 45 to return them to starting position.

In operation of the modified machine, stock 28 will be fed in either manually or automatically and will be cut off by the shear edges on the upper die 31 and shear block 18 on the first part of the downward stroke of the upper die. The upper die will then begin to bend the sheared piece of stock over the mandrel which will force the mandrel holder down on the springs 39 until the free end of the mandrel engages the anvil 40. Continued lowering of the upper die will complete the forming of the sheared piece into a U-shape and will press both the anvil 40 and anvil holder 41 downwardly to the die plate 12 against the compression of the springs 38 and 39. The final downward movement of the upper die will complete the bushing between itself and the lower die 18.

Retraction of the upper die permits both the anvil and the mandrel holder to rise on the rods 37 under the influence of the springs 38 and 39. The springs 39, being longer than the rear springs 38 cause the mandrel holder to raise the mandrel above the level of the anvil. The pneumatic cylinder may then be actuated either manually or automatically to knock the finished bushing off the mandrel. Use of the knock-off piece permits the body of the machine to be installed vertically since it is not necessary to rely on gravity to remove the bushing from the machine.

I have shown herein highly practical commercial embodiments of my invention. No attempt has been made to show further adaptations, as it is believed that this disclosure will enable those skilled in the art to adapt the invention as may be desired.

Having thus described my invention, what I claim as new and desire to secure by Letters Patent is:

1. A bushing forming machine comprising a slide member, a die mounted on said slide member, a die plate, a second die mounted on said die plate, a guide mounted on said die plate, a mandrel holder slidable on said guide, a mandrel fixedly mounted in said holder and between said die members, spring means for supportingly urging said holder toward said slide, yielding means in addition to said spring means for supporting said mandrel holder, and a frame member for supporting said slide, die plate, and yielding means.

2. A bushing forming machine comprising a slide member, a die mounted on said slide member, a die plate, a second die mounted on said die plate, a pair of guides mounted on said die plate, a mandrel holder slidable in one of said guides, a mandrel having one end mounted in said holder and extending between said die members, an anvil for supporting the free end of said mandrel mounted in the other of said guides, spring means for lifting said holder and said mandrel above said anvil, yielding means for supporting said anvil and mandrel above said die plate, and a frame member for supporting said slide, die plate, and yielding means, with said mandrel in a sloping position, said slide being movable toward said die plate.

3. In combination with a punch press having a slide and a bolster, a die secured to said slide, a pneumatic cylinder mounted on said press, fingers connected to the piston of said cylinder and extending through said bolster, a second die supported by said bolster and cooperable with said first die, a mandrel holder mounted on said bolster and arranged to abut against part of said fingers, a mandrel having one end secured to said holder, an anvil mounted on said bolster and arranged to abut against the rest of said fingers, spring means mounted on said bolster and arranged to raise said holder off of said fingers, and other spring means carried on said slide arranged to overcome said first mentioned spring means.

4. In combination with a punch press having a slide and a bolster, a die secured to said slide, a die plate secured to said bolster, a second die secured to said die plate and cooperative with said first die, a pair of guides positioned on each side of said second die, a mandrel holder slidable in one of said guides, a mandrel mounted in said holder and extending across said second die, an anvil mounted in the other of said guides and arranged to support the free end of said mandrel, movable fingers extending through said die plate for supporting said mandrel holder and said anvil, pneumatic cushioning means secured to said press and connected to said fingers, spring means positioned between said mandrel holder and said die plate and arranged to lift said holder above the upper limit of movement of said fingers, other spring means mounted on said slide for overcoming said first mentioned spring means, a shear block mounted between said guides and adjacent to said second die, and a shear plate secured to said first die cooperative with said shear block.

5. In combination with a punch press having a slide and a bolster, a die secured to said slide, a die plate secured to said bolster, a second die secured to said die plate and cooperative with said first die, a pair of guides positioned on each side of said second die, a mandrel holder slidable in one of said guides, a mandrel mounted in said holder and extending across said second die, an anvil mounted in the other of said guides and arranged to support the free end of the mandrel, movable fingers extending through said die plate for supporting said mandrel holder and said anvil, pneumatic cushioning means secured to said press and connected to said fingers, spring means positioned between said mandrel holder and said die plate and arranged to lift said holder above the upper limit of movement of said fingers, other spring means mounted on said slide for overcoming said first mentioned spring means, a shear block mounted between said guides and adjacent to said second die, and a shear plate secured to said first die cooperative with said shear block, said slide being movable away from said die plate sufficiently to disengage said second spring from said holder.

6. A bushing forming machine comprising a slide member, a die mounted on said slide, a die plate, a second die mounted on said die plate, rear guide rods extending through said die plate, an anvil slidable on said rear rods, front guide rods extending through said die plate, a mandrel holder slidable on said front rods, a mandrel carried by said mandrel holder and arranged to rest on said anvil, and a plurality of spring means extending through said die plate and arranged to lift said anvil and said mandrel holder along said rods, said spring means associated with said mandrel holder being longer than said spring means associated with said anvil, said first mentioned die being arranged to cooperate with said second die with said mandrel therebetween.

7. A bushing forming machine comprising a slide member, a die mounted on said slide, a die plate, a second die mounted on said die plate, rear guide rods extending through said die plate, an anvil slidable on said rear rods, front guide rods extending through said die plate, a mandrel holder slidable on said front rods, a mandrel carried by said mandrel holder and arranged to rest on said anvil, and a plurality of spring means extending through said die plate and arranged to lift said anvil and said mandrel holder along said rods, said spring means associated with said mandrel holder being longer than said spring means associated with said anvil, said first mentioned die being arranged to cooperate with said second die with said mandrel therebetween.

8. A bushing forming machine comprising a slide, a first die on said slide, a die plate, a second die on said die plate and cooperable with said first die, rear guide rods extending above said die plate, an anvil slidable on said rods, front rods extending above said die plate, a mandrel holder slidable on said front rods, a mandrel mounted in said holder and extending between said dies and over said anvil, a plurality of spring means for raising said anvil and said holder above said die plate, said spring means associated with said holder being longer than said spring means associated with said anvil, and a frame member for supporting said slide, die plate, and spring means.

JOHN T. MYERS.

REFERENCES CITED

The following references are of record in the file of this patent:

UNITED STATES PATENTS

| Number | Name | Date |
|---|---|---|
| 1,633,970 | Ball | June 28, 1927 |
| 1,652,912 | Setten | Dec. 13, 1927 |
| 1,849,054 | Boisson | Mar. 15, 1932 |
| 1,941,953 | Pump | Jan. 2, 1934 |
| 1,954,652 | Sherman | Apr. 10, 1934 |
| 2,077,336 | Lemming | Apr. 13, 1937 |
| 2,092,255 | Keller | Sept. 7, 1937 |
| 2,158,176 | Dewey | May 16, 1939 |
| 2,286,255 | Brooks | June 16, 1942 |
| 2,305,610 | Ernst | Dec. 22, 1942 |
| 2,330,554 | Cameron | Sept. 28, 1943 |

FOREIGN PATENTS

| Number | Country | Date |
|---|---|---|
| 194,446 | Great Britain | Mar. 15, 1923 |